No. 794,766. PATENTED JULY 18, 1905.
S. G. WRIGHT & J. T. VINES.
HOSE COUPLING.
APPLICATION FILED JAN. 27, 1904.
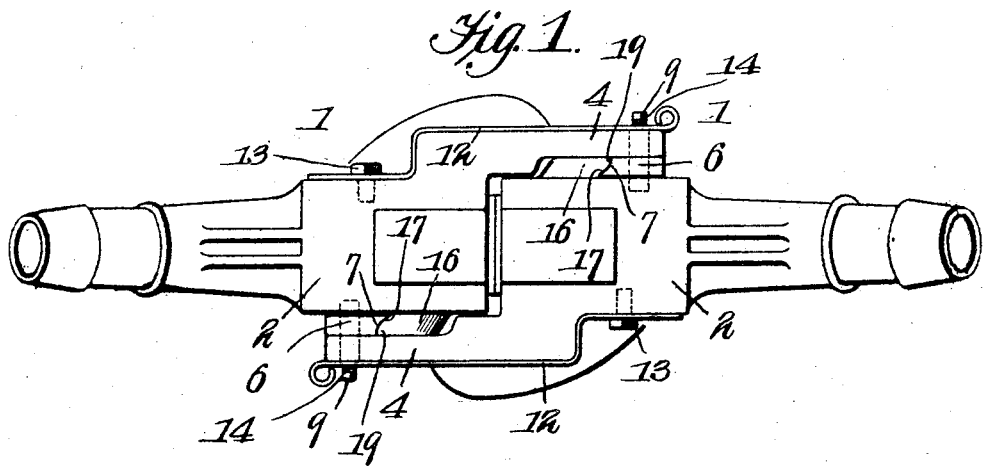
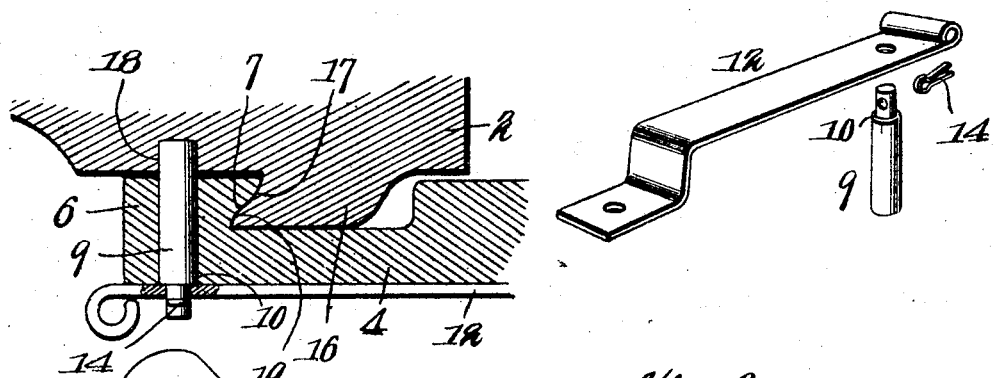
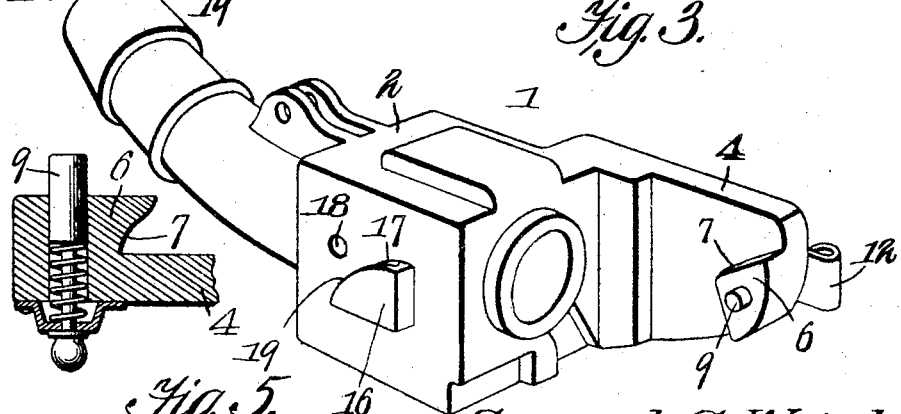
Samuel G. Wright and
John T. Vines
Inventors No. 794,766. Patented July 18, 1905.

UNITED STATES PATENT OFFICE.

SAMUEL G. WRIGHT AND JOHN T. VINES, OF HUNTINGTON, WEST VIRGINIA.

HOSE-COUPLING.

SPECIFICATION forming part of Letters Patent No. 794,766, dated July 18, 1905.

Application filed January 27, 1904. Serial No. 190,913.

*To all whom it may concern:*

Be it known that we, SAMUEL G. WRIGHT and JOHN T. VINES, citizens of the United States, residing at Huntington, in the county of Cabell and State of West Virginia, have invented a new and useful Hose-Coupler, of which the following is a specification.

This invention relates to improvements in couplings for the connection of steam-hose between railway-cars.

The principal object of the invention is to provide a hose-coupling in which provision is made for positively locking the two couplings in such manner as to prevent accidental separation under ordinary conditions of use.

A further object of the invention is to provide a locking device which will be automatic in its action and move to engaging position as the members of the coupling are connected.

A still further object of the invention is to provide a coupler of this character in which spring-pressed locking-pins are so arranged as to automatically move to locking position when the couplings are brought together and which may be manually turned to releasing position when the couplers are to be disconnected.

With these and other objects in view, as will more fully hereinafter appear, the invention consists in the novel construction and arrangement of parts hereinafter described, illustrated in the accompanying drawings, and particularly pointed out in the appended claim, it being understood that various changes in the form, proportions, size, and minor details of the structure may be made without departing from the spirit or sacrificing any of the advantages of the invention.

In the accompanying drawings, Figure 1 is a plan view of a pair of couplers constructed in accordance with the invention. Fig. 2 is a sectional plan view of a portion of the same. Fig. 3 is a detail perspective view of one of the couplers. Fig. 4 is a perspective view of the locking-pin and its actuating-spring detached. Fig. 5 is a detail sectional view illustrating a slightly-modified construction.

In the drawings, 1 indicates a coupler having a body portion 2, on which projects a hose-attaching member. Near one side of the couplings extends a forward-projecting wing 4, that is provided at or near its outer end with an integral cam 6, the acting surface of which is concaved and is provided with a groove 7. Through the cam and the wing of which it forms a part is bored an opening for the passage of a locking-pin 9, the outer end of which is reduced to form a shoulder 10. Over the reduced end portion 9 passes a strip 12, formed of spring-steel, that is secured at one end to the coupler by means of a bolt 13, while the opposite end of said spring projects beyond the end of the wing and is partly coiled or bent back upon itself to form a finger-hold to be used in moving the spring to pin-releasing position. The pin and spring are locked together by the shoulder 10, and the reduced end portion of said spring is provided with an opening for the passage of a locking-pin 14, so that the pin must move the spring in both directions. When in locking position, the spring lies flat against the outer face of the wing 4, and the inner end of the pin projects for some distance beyond the inner face of the cam. Projecting from the opposite side of the coupling is a cam-block 16, having a rounded or convex operating-face and provided with a groove 17 of gradually-increasing depth from the top to the bottom of the cam and defining a marginal flange 19, which is of gradually-decreasing thickness from the top to the bottom of the cam, this flange serving by entrance into the groove to gradually bring the couplings toward each other laterally, so that when in engaging positions the outer faces of the cams will be arranged but a short distance from the faces of the adjacent coupling members, as indicated in Fig. 1. On the side of the body portion 2 of each coupling is an opening 18 for the reception of the locking-pin carried by the mating coupling, and when these parts have interlocked the cams and pins will both serve to prevent separation of the coupling members under longitudinal stress, while the pins will prevent turning movement of the couplings and the riding of the cams one over the other to uncoupling position.

In connecting the couplings the lower surface of each of the wing-cams is pressed against the upper surface of the cam carried by the body portion of the mating coupler, and the ends of the pins will then be pressed against the sides of the couplers. The coupling operation is completed by imparting slight turning movement in a vertical direction to both couplers, and the concaved cams ride over the convex or rounded cams. It will be noted that the flanges of both cam-surfaces are tapered in cross-section, so that during the engagement of the cams with each other the pins will be forced outward against the stress of their carrying-springs until the ends of the pins arrive opposite the openings 18, whereupon the springs will force the pins into said openings and complete the locking operation. When fully locked, the flange of one cam is fully entered in the groove of the opposite cam, and the two members will thus have been brought together in a lateral direction and firmly united by the engagement of the cams with each other. Any separating movement of the couplers is prevented by the engagement of the pins in the recesses or openings 18, the pins also serving to prevent the parting of the couplers under ordinary stress. To uncouple, it is simply necessary to press the springs outward by grasping their rounded end portions and permit the couplings to separate.

It is obvious that the construction may be modified by employing a helical spring for each of the pins and placing on the outer end of each pin a small knob to be grasped when uncoupling. Such a construction is illustrated in Fig. 5.

Having thus described the invention, what is claimed is—

The combination with a pair of couplers having interlocking cams, each of said couplers having a pin-receiving opening, of spring-strips secured at one end to the couplers, locking-pins adapted to guiding-openings formed in the couplers, said pins having reduced end portions passing through openings in the ends of the strips, and means for locking said pins to the strips.

In testimony that we claim the foregoing as our own we have hereto affixed our signatures in the presence of two witnesses.

SAMUEL G. WRIGHT.
JOHN T. VINES.

Witnesses:
J. H. JOCHUM, Jr.,
FRANK S. APPLEMAN.